(12) United States Patent
Persson et al.

(10) Patent No.: US 8,773,593 B2
(45) Date of Patent: Jul. 8, 2014

(54) NOISE REDUCTION FILTER CIRCUITRY AND METHOD

(75) Inventors: Erik Persson, Lund (SE); Per Edgren, Lund (SE)

(73) Assignee: ARM Limited, Cambridge (GB)

( * ) Notice: Subject to any disclaimer, the term of this patent is extended or adjusted under 35 U.S.C. 154(b) by 701 days.

(21) Appl. No.: 12/929,137

(22) Filed: Jan. 3, 2011

(65) Prior Publication Data
US 2012/0169936 A1 Jul. 5, 2012

(51) Int. Cl.
*H04N 5/21* (2006.01)

(52) U.S. Cl.
USPC ........................................ 348/609; 348/222.1

(58) Field of Classification Search
USPC ........... 348/607–609, 222.1, 252, 256, 228.1, 348/255, 273, 268, 266
See application file for complete search history.

(56) References Cited

U.S. PATENT DOCUMENTS

| | | | | |
|---|---|---|---|---|
| 6,005,626 | A * | 12/1999 | Ding | 375/240.16 |
| 6,697,109 | B1 * | 2/2004 | Daly | 348/268 |
| 7,751,642 | B1 | 7/2010 | Persson | |
| 8,564,724 | B2 * | 10/2013 | Hong et al. | 348/614 |
| 2010/0194911 | A1 * | 8/2010 | Motomura et al. | 348/222.1 |
| 2011/0019094 | A1 * | 1/2011 | Rossignol et al. | 348/607 |

OTHER PUBLICATIONS

Norell, "Spatio-Temporal Noise Reduction ASIC for Real-Time Video Processing", *Mid Sweden University*, 4 pages.
Amer et al., "A New Video Noise Reduction Algorithm Using Spatial Subbards", *University of Dortmund*, 5 pages.
Sen et al., "Computationally fast techniques to reduce AWGN and speckle in videos", *IET Image Process*, vol. 1, No. 4, 2007, pp. 319-334.

* cited by examiner

*Primary Examiner* — Aung S Moe
(74) *Attorney, Agent, or Firm* — Nixon & Vanderhye P.C.

(57) ABSTRACT

The present invention provides filter circuitry for reducing noise in an input stream of image signals having luminance and chrominance components. Spatial filter circuitry is provided which, for a current image signal of the input stream, generates a spatially filtered internal signal from at least the luminance component of the current image signal. Comparison circuitry is configured to compare the current image signal with temporal data derived from multiple image signals of the input stream, and to generate a control signal dependent on the comparison. Combining circuitry is then used to combine, in a ratio determined by the control signal, the spatially filtered internal signal with at least a luminance component derived from the temporal data, in order to generate at least the luminance component of a current output image signal that forms a noise reduced version of the current image signal. Such a form of filter circuitry has been found to provide a filtered stream of image signals with significant noise suppression, and is particularly well suited to providing a filtered stream of image signals for input to video encoding circuitry, enabling significant improvements in the efficiency of the encoding circuitry by virtue of the manner in which the noise is suppressed.

19 Claims, 11 Drawing Sheets

| CURRENT IMAGE SIGNAL | STORED TEMPORALLY FILTERED IMAGE SIGNAL |
|---|---|
| IMAGE SIGNAL 1 | SPECIAL CASE |
| IMAGE SIGNAL 2 | VERSION AFTER FILTERING IMAGE SIGNAL 1 |
| IMAGE SIGNAL 3 | VERSION AFTER FILTERING IMAGE SIGNAL 2 |
| ........ | ........ |

FIG. 6C

NOISE REDUCTION FILTER CIRCUITRY AND METHOD

BACKGROUND OF THE INVENTION

1. Field of the Invention

The present invention relates to noise reduction filter circuitry, and to a method of operation of such filter circuitry. In particular, the present invention relates to filter circuitry for reducing noise in an input stream of image signals forming a video stream, and is suitable for use prior to input to a video encoder used to compress the video stream.

2. Description of the Prior Art

Image noise is a problem dating back to the early days of photography. The problem has since extended into the video domain, and is today a major limiting factor in digital video, both in terms of visual quality and compression performance.

The most obvious cause of image noise is the random arrival rate of incoming photons. This noise cannot be eliminated, but it can be reduced to acceptable levels by increasing the number of photons per pixel, effectively reducing the variance around the true pixel value. The traditional way of increasing the number of photons is to increase exposure time and aperture size.

Recent breakthroughs in handheld devices have enabled consumers to use their cell phones as imaging devices, often replacing the use of digital cameras completely. However, tougher constraints on size and weight, in combination with demand for video recording, limit the practical range of exposure time and aperture size.

In modern handheld devices, image sensors are used to create digital images from optical sources, and are typically constructed as arrays of photodetector elements. However, digital image sensors are colour blind, in that they only count the number of incoming photons in a specific spot. In order to acquire colour images, a colour filter array (CFA), such as a Bayer filter, is placed in front of the sensor array, passing wavelength limited photons to each pixel sensor.

Images captured in such a manner suffer from noise associated with a variety of sources, the most common type of which is additive white Gaussian noise (AWGN). Whilst at the time of image capture by the digital image sensor, the noise in each pixel may be assumed to be independent and normally distributed, such digitally captured images are typically subjected to a number of image signal processing techniques prior to forming an input stream of image signals used in downstream video processing circuits such as a video encoder. Firstly, colour interpolation from neighbouring pixels is used to compute the most likely RGB colour tuple in each pixel position. Such a technique, also commonly known as demosaicing, distorts the noise distribution and presents a significant problem when dealing with noise detection. In particular, the noise in adjacent pixels is no longer independent. After such colour interpolation, the resultant image data is typically subjected to colour correction and gamma correction, these techniques being used to compensate for flaws in the image sensor and to adapt the image to the human visual system. Both colour correction and gamma correction act as digital amplification of noise.

Following such colour and gamma correction, it is typical to convert the RGB signals into YUV colour space composed of one luma channel and two chroma channels. The luma channel Y is a weighted sum of the gamma-corrected RGB colours, whilst the chroma channels U and V (also referred to as Cb and Cr) are defined as the blue and red differences from the luma channel. Many applications, ranging from compression to transmission of images and video, operate in the YUV colour space because of the benefits of separating luma and chroma channels. In particular, the eye is more sensitive to luma changes and this is often exploited by using a lower resolution for the chroma channels, known as chroma sub-sampling.

From the above discussion, it will be appreciated that by the time an input stream of image signals is produced that is ready to be used by an application such as a video encoding application, the original noise distribution at the time of capture by the image sensor has been distorted and amplified. It is important to try and reduce this noise, not only because of its effect on visual quality, but also because of its adverse effects on compression performance of such an encoder. In particular, such noise can reduce the quality of the signal output by an encoder at a given bit rate, or increase the bit rate needed to achieve a given quality requirement, thereby reducing the amount of compression achieved.

Image denoising is a popular research area. Video denoising is by its nature an even broader topic, of which image denoising is a subset known as spatial filtering. In contrast, filters that use information from several images (also known as frames) simultaneously are called temporal filters. Combinations of the two types are known as spatiotemporal filters. Temporal filters generally allow for richer denoising possibilities but are more expensive to implement in terms of memory bandwidth, which is an important issue in embedded systems.

Video sequences can be considered to consist of two separate components, namely the film itself formed by a series of images, and the unwanted noise component. The true video sequence is assumed to be correlated in time while noise typically has no inter-frame correlation. This is true for an uncompressed input stream and enables temporal filters to be used for video denoising.

The optimal method for reducing image noise is to increase the exposure time. However, in video acquisition the exposure time is limited by the frame rate. It is possible to compensate for this by using temporal filters to average consecutive frames. Unconstrained averaging on the other hand introduces motion blur that may be even more visually disturbing than the original noise.

Norell et al in the article "Spatio-Temporal Noise Reduction ASIC for Real-Time Video Processing", Department of Information Technology, ITE, Mid Sweden University, http://www.es.isy.liu.se/norsig2000/publ/page021_id103.pdf, 2000, propose a multi-frame filter with variable depth. The algorithm proposed in Norell focuses on removing impulse noise such as salt and pepper noise and lost frames by applying a median filter (a type of spatial filter) to pixel values in consecutive frames. The depth of the filter (i.e. the number of frames that are used by the temporal filter) is local within a frame and decided by comparing luma values in a fixed spatial area with past and future frames. Hence, in accordance with such a technique, some initial spatial filtering is performed within each frame in order to produce an average pixel intensity in the fixed spatial area, which is then compared between each frame in order to decide on the number of frames used by the temporal filter. The output produced is then the result of the temporal filtering performed using the determined number of frames.

Whilst the above article by Norell et al describes a variable temporal depth form of temporal filter, another type of temporal filter is known as a motion adaptive temporal recursive filter. Such a filter is described in the article "A New Video Noise Reduction Algorithm Using Spatial Sub-Bands" by A Amer et al, International Conference on Electronics, Circuits, and Systems, Pages 45 to 48, IEEE, 1996. Temporal recursive filters keep an accumulated frame in memory that is combined with the new frame to form the filter output. The article by Amer et al describes use of a motion adaptive control unit to control the averaging process locally in the spatial domain. In particular, the motion adaptive control unit calculates the weighting factor between the accumulated frame and the current frame.

As mentioned earlier, temporal filters are relatively expensive to implement in terms of memory bandwidth. Whilst recursive filters of the type described by A Amer et al can offer benefits in this regard when compared with variable temporal depth filters, due to the need to access only a single previous frame (that representing the accumulated image) rather than multiple image frames, such recursive filters have traditionally had a significant disadvantage. Recursive filters require a trade-off between motion blur and noise. In particular, motion blur and noise cannot be simultaneously avoided in high movement areas even with a carefully designed motion adaptive control unit.

The article "Computationally Fast Techniques to Reduce AWGN and Speckle in Videos" by D Sen et al, IET Image Process, 2007, 1, (4), Pages 319 to 334, describes a scheme that uses a change detection technique to measure the interframe motion and carry out estimations in both the spatial and temporal directions of the video. In particular, a spatial estimation is first performed, and then the output from the spatial estimation is used as an input for the temporal estimation, such that the temporal estimation is then carried out using the spatial estimates. The output from the temporal estimation process is hence a spatiotemporal estimate. Thereafter, the spatiotemporal estimate output by the temporal estimation block and the original spatial estimation output by the spatial estimation block are subjected to a combining process in order to produce the final filtered output. Whilst this enables some variation between spatial filtering and temporal filtering, both of the inputs to the combination circuitry have been subjected to the spatial estimation process.

It would be desirable to provide an improved technique for reducing noise in an input stream of image signals forming a video stream.

SUMMARY OF THE INVENTION

Viewed from a first aspect, the present invention provides filter circuitry for reducing noise in an input stream of image signals having luminance and chrominance components, comprising: spatial filter circuitry configured, for a current image signal of the input stream, to generate a spatially filtered internal signal from at least the luminance component of the current image signal; comparison circuitry configured to compare the current image signal with temporal data derived from multiple image signals of said input stream, and to generate a control signal dependent on said comparison; and combining circuitry configured to combine, in a ratio determined by said control signal, the spatially filtered internal signal with at least a luminance component derived from said temporal data, in order to generate at least the luminance component of a current output image signal forming a noise reduced version of the current image signal.

Based on a comparison between the current image signal and temporal data derived from multiple image signals of the input stream, a control signal is generated which determines the proportion of the output from the filter circuitry which is generated by the spatially filtered internal signal and the proportion which is generated from the temporal data. This process is used to control at least the value of the luminance component output from the filter circuitry, and allows that luminance value to be generated entirely from the spatially filtered signal, entirely from the temporal data, or in any combination between those two limits. This has been found to provide a particularly effective mechanism for reducing noise in the input stream of image signals, and is particularly effective when used to generate signals then provided to encoding circuitry since the filtering performed by the present invention has been found to significantly improve the efficiency of operation of the encoder due to the noise removed by the filter circuitry.

In one embodiment, the filter circuitry further comprises temporal filter circuitry configured, for the current image signal, to generate a temporally filtered image signal in dependence on the temporal data, the temporally filtered image signal having luminance and chrominance components. Hence, in such embodiments, the temporal data used by the comparison circuitry is also the temporal data used by the temporal filter circuitry to generate a temporally filtered image signal for the current image signal.

In one particular embodiment, the temporal data comprises a stored temporally filtered image signal, and the comparison circuitry comprises change detection circuitry configured to detect a change between the current image signal and the stored temporally filtered image signal, and to generate the control signal dependent on the detected change. In one particular embodiment, the stored temporally filtered image signal is generated using a temporal recursive filter that keeps as the stored temporally filtered image signal an accumulated image signal generated as a result of the temporal filtering of the preceding image signals.

Hence, in one embodiment, the temporally filtered image signal generated by the temporal filter circuitry for the current image signal is used to form the stored temporally filtered image signal for use in connection with a subsequent image signal in said input stream. The use of such a stored temporally filtered image signal has been found to reduce the bandwidth requirements of the filter circuitry, which is particularly advantageous in modern embedded systems where memory bandwidth requirements are a significant issue.

Whilst the combining circuitry may be used to produce both the luminance and chrominance components of the output image signal produced by the filter circuitry, in one embodiment such combining circuitry is only used to produce the luminance component. In particular, in one embodiment, the spatial filtering circuitry is configured to generate the spatially filtered internal signal from only the luminance component of the current image signal, the combining circuitry is configured to generate only the luminance component of the current output image signal, and the filter circuitry further comprises chrominance generation circuitry for generating the chrominance component of the current output image signal from the chrominance component of the temporally filtered image signal.

The handling of the luminance and chrominance components separately in this manner has been found to enable an output from the filter to be produced which has significantly suppressed noise, and hence provides a particularly good form of signal for input to encoding circuitry in order to enable either improved compression rates, or improved image quality, to be achieved.

Typically, the chrominance component will be subjected to more noise than the luminance component. Accordingly, in one embodiment, the chrominance generation circuitry applies a spatial filtering operation to generate the chrominance component of the current output image signal from the chrominance component of the temporally filtered image signal.

The change detection circuitry can take a variety of forms. However, in one embodiment, the change detection circuitry comprises absolute difference circuitry for creating an absolute difference between the luminance component of the stored temporally filtered image signal and the luminance component of the current image signal, and to generate the control signal in dependence on said absolute difference. Hence, the control signal is caused to vary dependent on the magnitude of the difference between the signals input to the change detection circuitry.

The manner in which the control signal is caused to vary in dependence on the observed difference in magnitude can take a variety of forms. However, in one embodiment the change detection circuitry further comprises nonlinear mapping circuitry for applying a nonlinear mapping function to a signal derived from said absolute difference, in order to generate a value of the control signal. Nonlinear mapping functions have been found to provide improved noise suppression relative to linear mapping functions.

In one particular embodiment, the nonlinear mapping function is an exponential function such that a value of the control signal increases exponentially with increase in the signal derived from the absolute difference, and the combining circuitry is arranged, in response to changes in the value of the control signal, to change proportionally the ratio between said spatially filtered internal signal and said at least a luminance component derived from said temporal data. The inventors have determined experimentally that an exponential relationship between the detected change and the value of the control signal produces the best results, both in terms of perceived image quality and the quality of the compression achieved by the subsequent encoding operation.

Whilst in one embodiment the output from the absolute difference circuitry could be provided directly to the nonlinear mapping circuitry, in one embodiment the change detection circuitry further comprises low pass filter circuitry to generate the signal derived from the absolute difference that is then used as an input to the nonlinear mapping circuitry. This enables any noise in the absolute difference values determined by the absolute difference circuitry to be suppressed leading to a more accurate generation of the control signal.

The temporal filter circuitry may operate in a variety of ways. However, in one embodiment, the temporal filter circuitry generates the temporally filtered image signal by combining the current image signal with the stored temporally filtered image signal in a ratio determined by said control signal. Hence, in such embodiments the control signal generated by the comparison circuitry is used to control both the combining circuitry and the temporal filter circuitry, thereby providing a particularly efficient implementation.

The spatial filter circuitry can take a variety of forms. However, in one embodiment the spatial filter circuitry comprises low pass filter circuitry for removing high frequency features from said at least the luminance component of the current image signal, said high frequency features including high frequency noise, and nonlinear thresholding circuitry for recovering one or more of said high frequency features that represent image detail removed by the low pass filter circuitry. This provides significant improvements in the sharpness of the output from the spatial filter circuitry when compared with a simple low pass filter.

The nonlinear thresholding circuitry can be constructed in a variety of ways. However, in one embodiment the nonlinear thresholding circuitry comprises subtraction circuitry for subtracting the output of the low pass filter circuitry from said at least the luminance component of the current image signal in order to generate a first signal identifying the high frequency features. Modifying circuitry then applies a nonlinear function to the first signal to generate a second signal in which the high frequency features of low amplitude are suppressed, these low amplitude high frequency features typically representing noise. Finally, summation circuitry adds the second signal to the output of the low pass filter circuitry. This provides a particularly efficient implementation for the nonlinear thresholding circuitry.

The chrominance generation circuitry can be constructed in a variety of ways. However, in one embodiment the chrominance generation circuitry is constructed in the same manner as the spatial filter circuitry, and hence performs spatial filtering of the chrominance component of the temporally filtered image signal.

In one embodiment, each image signal comprises a plurality of pixel data items, each pixel data item comprising luminance data and chrominance data for the associated pixel. The chrominance data may be individually specified for each pixel data item, or in one embodiment several pixel data items may share the same chrominance data.

In one embodiment, the comparison circuitry is configured to compare each pixel data item of the current image signal with a corresponding pixel data item of temporal data, and to generate a separate control signal for each pixel data item. By generating a control signal for each pixel data item, the noise suppression capabilities can be significantly enhanced enabling the proportion of spatially filtered and temporally filtered data included in the output image signal to be varied on a pixel-by-pixel basis.

Viewed from a second aspect, the present invention provides video encoding circuitry comprising: filter circuitry in accordance with the first aspect of the present invention for receiving an input stream of image signals and generating a corresponding output stream of image signals having reduced noise when compared with the input stream; and encoder circuitry for applying a compression scheme to compress the output stream from the filter circuitry in order to generate a bitstream of encoded video data.

Viewed from a third aspect, the present invention provides a method of reducing noise in an input stream of image signals having luminance and chrominance components, comprising the steps of: employing spatial filter circuitry, for a current image signal of the input stream, to generate a spatially filtered internal signal from at least the luminance component of the current image signal; comparing the current image signal with temporal data derived from multiple image signals of said input stream, and generating a control signal dependent on said comparison; and combining, in a ratio determined by said control signal, the spatially filtered internal signal with at least a luminance component derived from said temporal data, in order to generate at least the luminance component of a current output image signal forming a noise reduced version of the current image signal.

Viewed from a fourth aspect, the present invention provides filter circuitry for reducing noise in an input stream of image signals having luminance and chrominance components, comprising: spatial filter means for generating, for a current image signal of the input stream, a spatially filtered internal signal from at least the luminance component of the current image signal; comparison means for comparing the current image signal with temporal data derived from multiple image signals of said input stream, and for generating a control signal dependent on said comparison; and combining means for combining, in a ratio determined by said control signal, the spatially filtered internal signal with at least a luminance component derived from said temporal data, in order to generate at least the luminance component of a current output image signal forming a noise reduced version of the current image signal.

BRIEF DESCRIPTION OF THE DRAWINGS

The present invention will be described further, by way of example only, with reference to embodiments thereof as illustrated in the accompanying drawings, in which:

FIGS. 6A to 6C schematically illustrate the arrangement of image signals within the input stream, the arrangement of pixel data within each image signal, and the form of stored temporally filtered image signal used when temporally filtering each image signal in the input stream, respectively;

DESCRIPTION OF EMBODIMENTS

Figure 1:
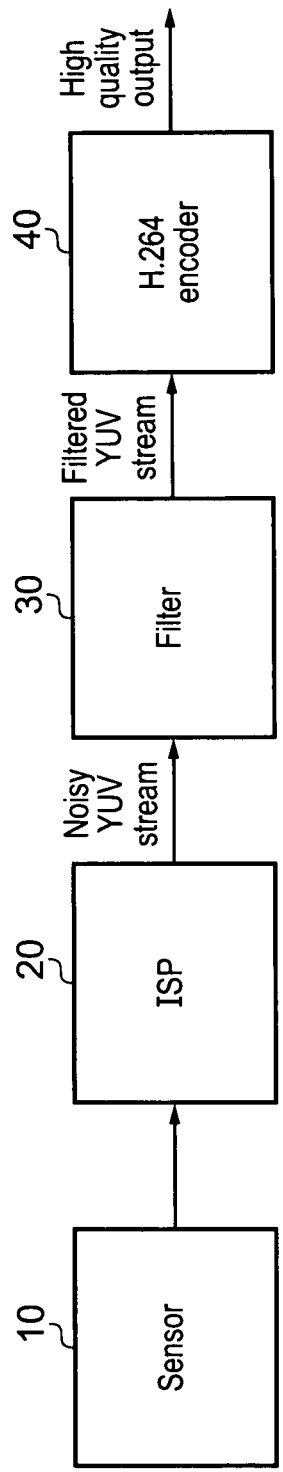
FIG. 1 is a block diagram schematically illustrating one application of the filter circuitry of embodiments.

In accordance with an embodiment, a stream of YUV images is pre-filtered before being passed to a video encoder. FIG. 1 shows the intended application of the filter in accordance with such an embodiment. As shown in FIG. 1, a sequence of images forming a video signal are captured by a sensor 10, and are then subjected to some post-processing steps in an image signal processor (ISP) 20. In particular, the raw input data produced by the sensor is passed through several steps in an image pipeline within the ISP 20, resulting in the generation of an input stream of image signals in YUV format. This input stream of image signals suffers from noise introduced by the sensor 10, which is then typically modified and amplified by some of the functions performed within the ISP 20.

A filter 30 constructed in accordance with embodiments of the present invention is then used to produce a filtered stream of image signals in which the noise has been reduced, that filtered stream then being provided to an encoder 40. The encoder 40 typically performs a video compression operation in accordance with a defined Standard. For example, the encoder 40 may apply the H.264/MPEG-4 or AVC (Advanced Video Coding) Standard which is a block-oriented motion-compensation-based codec standard commonly used for video encoding. Such an encoder can produce a high quality compressed video stream, but noise such as that introduced by the sensor and ISP 20 can significantly inhibit the compression efficiency achieved by the encoder. However, through use of the filter 30 of embodiments of the present invention, the characteristics of the encoder can be significantly improved, either by improving the quality of the compressed video produced for a given bit rate, or enabling a reduced bit rate (i.e. a higher compression) to be achieved at a given quality requirement.

Figure 2:
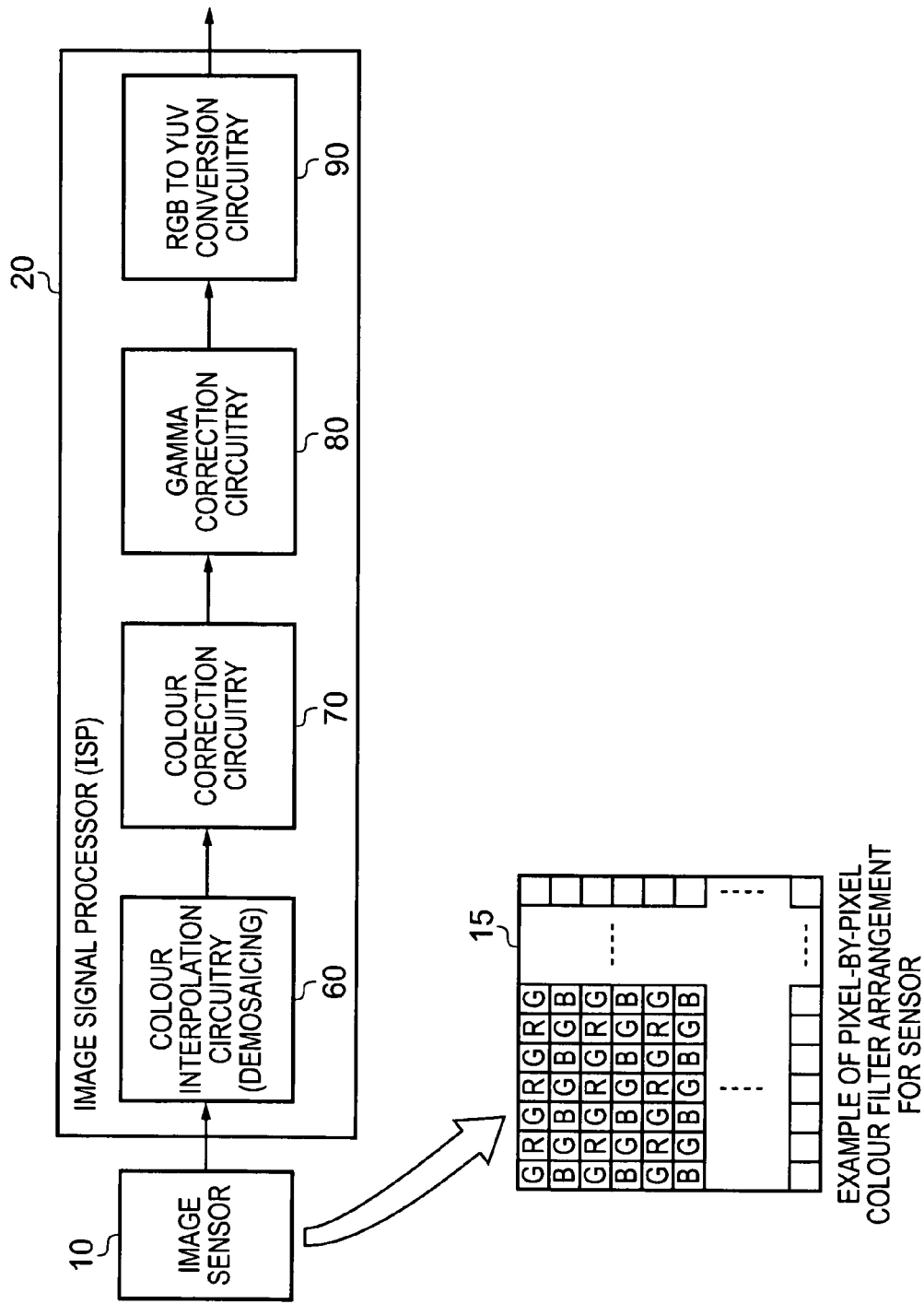
FIG. 2 is a diagram illustrating in more detail the image sensor and image signal processor of FIG. 1.

FIG. 2 illustrates in more detail the sensor 10 and ISP 20. The image sensor 10 is used to create digital images from an optical source and is constructed as an array of photodetector elements. There are two major types of image sensor, namely the charge-coupled device (CCD) and the CMOS active pixel sensor (APS). The CCD sensor uses capacitors to build up charge proportional to the number of incoming photons (i.e. light intensity). The CMOS APS sensor integrates charge by current flow through a photodiode or a photogate.

The major advantage of the APS sensor is its use of CMOS technology, enabling integration with peripheral electronics such as control signal generators and analog-to-digital converters (ADCs) on the same chip. As a result, the CMOS APS is compact in size, cheap and has a low power consumption when compared to CCD sensors. This makes the CMOS APS particularly well suited for mobile imaging applications.

CMOS image sensors suffer from noise associated with a variety of sources, the most common type of noise being additive white Gaussian noise (AWGN). As will be understood by those skilled in the art, various other forms of noise affect such image sensors, for example photon shot noise (also known as photon counting noise) which is particularly noticeable with short exposure times and low light conditions, thermal and flicker noise created by vibrations of a large number of electrons, dark current noise introduced by the photodiode leakage current in the pixel sensor, fixed pattern noise resulting from defects in the CMOS sensors, etc. All of these aforementioned temporally varying noise sources are, or can be approximated to be, distributed as additive white Gaussian noise.

The operations performed by the image signal processor 20 will often alter the noise present in the data produced by the image sensor 10, as will be discussed in more detail below. Firstly, digital image sensors are colour blind, in that they only count the number of incoming photons in a specific spot. In order to acquire colour images, a colour filter array (CFA) such as the Bayer filter array 15 illustrated schematically in FIG. 2 is placed in front of the sensor array, passing wavelength limited photons to each pixel sensor. As can be seen from FIG. 2, such a Bayer filter places a green filter at every alternate pixel position, with those green filters being separated by red filters in every alternate line and being separated by blue filters in every other alternate line. It will hence be appreciated that the raw data produced by the image sensor does not provide RGB data for each pixel.

Accordingly, the ISP 20 will typically as a first stage perform demosaicing of the raw image data within colour interpolation circuitry 60. In accordance with such techniques, colour intensities from neighbouring pixels are used to compute the most likely RGB colour tuple in each pixel position. This demosaicing step distorts the noise distribution and presents a significant problem when dealing with noise detection. In particular, in the raw data produced by the image sensor, the noise in each pixel is considered to be independent and normally distributed. However, as a result of the demosaicing process, the noise in adjacent pixels is no longer independent.

Following demosaicing, the image signals are typically passed through colour correction circuitry 70 which compensates for differences between the image sensor filters and the human eye's response to red, green and blue colour values. Thereafter, gamma correction circuitry 80 applies a non-linear operation to adjust the image signal having regard to the anticipated properties of the reproducing device, such functions being well understood by those skilled in the art. The colour correction process performed by the colour correction circuitry 70 typically involves a matrix multiplication followed by an addition to remove possible offsets, whilst the gamma correction function performed by the gamma correction circuitry 80 is typically an exponential function applied to each pixel. Both colour correction and gamma correction act as digital amplification of noise.

Finally, it is typical for the ISP 20 to convert the RGB signals produced by the preceding steps into YUV (also referred to as YCbCr) signals, since many applications ranging from compression to transmission of images and video, operate in the YUV colour space because of the benefits of separating luma and chroma channels. In particular, the eye is more sensitive to luma changes and this is often exploited by using a lower resolution for the chroma channels, known as chroma sub-sampling. For example, a chroma sub-sampling ratio of 1:4 is often used, this format commonly being known as YUV 420, in which four pixels are represented by four Y values, one U value and one V value.

From the above discussion, it will be seen that the operation of a typical ISP 20 serves to adjust the noise introduced when the images are originally captured by the image sensor 10, and to amplify that noise. It is important to seek to remove or at least reduce this noise prior to performing encoding within the encoder 40, as otherwise the noise can significantly impact the efficiency of the operation of the encoder as discussed earlier.

Figure 3:
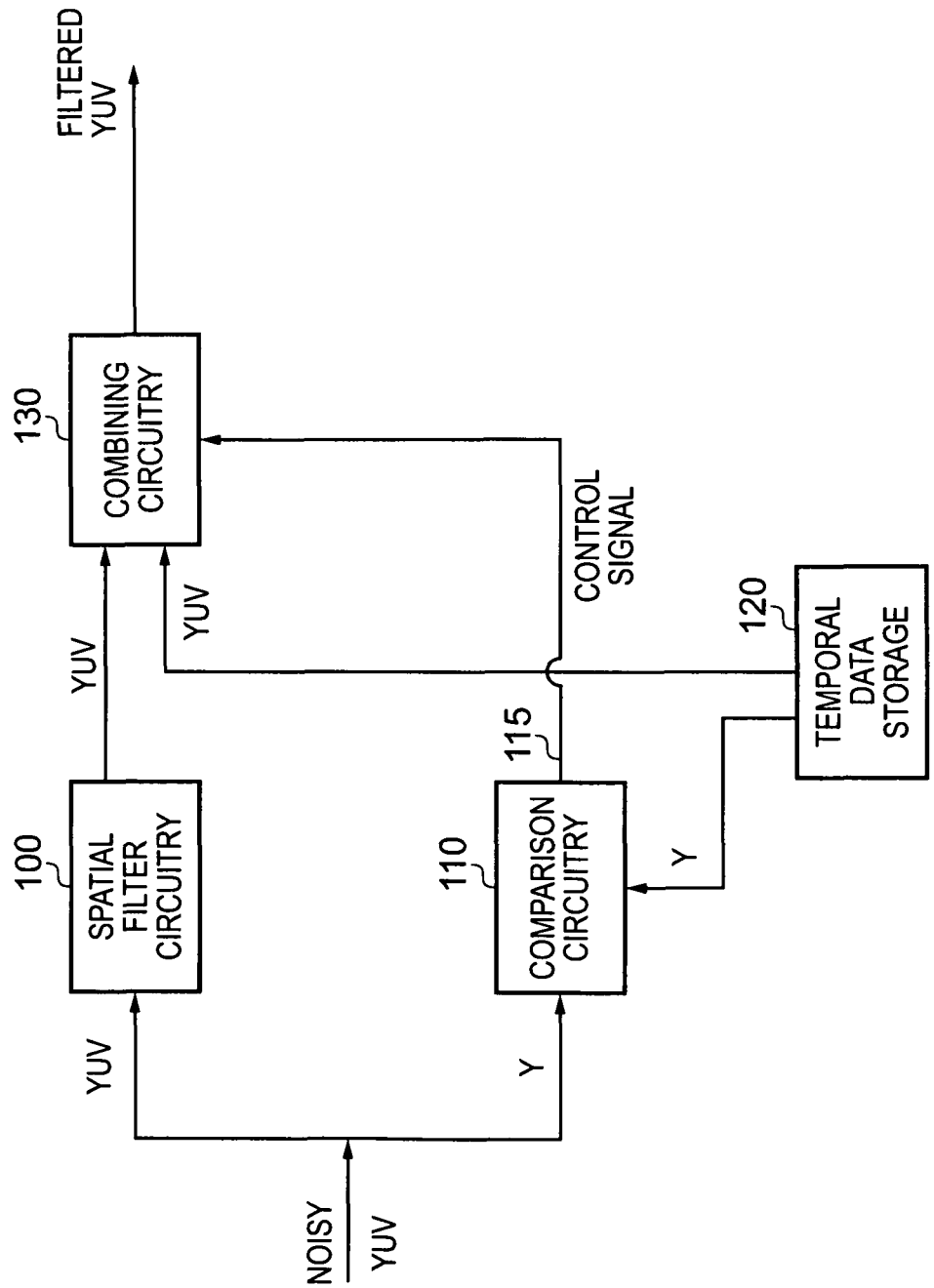
FIG. 3 is a block diagram illustrating filter circuitry in accordance with one embodiment.

FIG. 3 is a block diagram schematically illustrating the construction of filter circuitry 30 in accordance with one embodiment. As shown in FIG. 3, the noisy YUV stream produced by the ISP 20 is routed to spatial filter circuitry 100 which generates a spatially filtered internal signal passed to combining circuitry 130. If desired, the spatial filter circuitry 100 can be arranged to apply different strengths of filtering to the luminance component and the chrominance component, for example to apply stronger filtering of the chrominance component where it is more noisy than the luminance component.

The noisy YUV stream from the ISP 20 is also passed to the comparison circuitry 110. In particular, the luminance part of the stream is passed to the comparison circuitry, which also receives luminance data from temporal data stored within a temporal data storage 120. The temporal data is derived from multiple image signals of the input stream, and in one embodiment may be generated using any suitable temporal filtering mechanism. The temporal data is also provided from the temporal data storage 120 to the combining circuitry 130 to form a second input to the combining circuitry.

The comparison circuitry 120 then compares the luminance of the current image signal being processed by the filter 30 with the luminance component of the temporal data in order to generate a control signal output over path 115 whose value is dependent on the comparison. Typically, the comparison circuitry will look for changes between the current image signal and the temporal data as indicated by the respective luminance values, with small changes being indicative of a slowly moving image, and large changes being indicative of a fast moving image.

As discussed earlier, temporal filters tend to introduce significant motion blur in fast moving images. Spatial filtering circuitry 100 will also typically introduce a small amount of blur, but this is motion independent and is instead a direct result of the spatial filtering applied. For instance, considering an example of a spatial filter that uses a spatial low-pass filter, also known as a smoothing filter, then a certain amount of blurring occurs due to the addition of information into each pixel from information in the surrounding pixels. However, this blurring represents a significantly smaller artefact than is introduced by using a temporal filter for a fast moving image. In addition, as will be discussed later with reference to FIG. 7, a particular form of spatial filter is used in one embodiment which significantly sharpens the output from the spatial filter circuitry.

Accordingly, in one embodiment, the control signal is set by the comparison circuitry such that when it is determined that an image is slow moving, the combining circuitry chooses a larger proportion of the temporal data to form the filtered YUV stream, whilst when an image is detected to be fast moving, the control signal causes the combining circuitry 130 to select a larger proportion of the output of the spatial filter circuitry 100 to form the filtered YUV stream. Due to the arrangement of the embodiment, the control signal can vary between a value which causes the combining circuitry to use only the output from the spatial filter circuitry 100 (e.g. for very fast moving images) and a value which causes only the temporal data 120 to form the filtered YUV stream (e.g. for an image that is determined to be very slow moving or not moving at all), or to take values indicating any combination between those extremes. Further, the control signal can be set at a very fine level of granularity. For example, in one embodiment, the control signal can be set independently for every pixel of each image signal within the input YUV stream. As a result, this allows a filtered YUV stream to be produced in which noise has been significantly removed or suppressed, thereby enabling significant improvements in the efficiency of the encoder 40.

Figure 4:
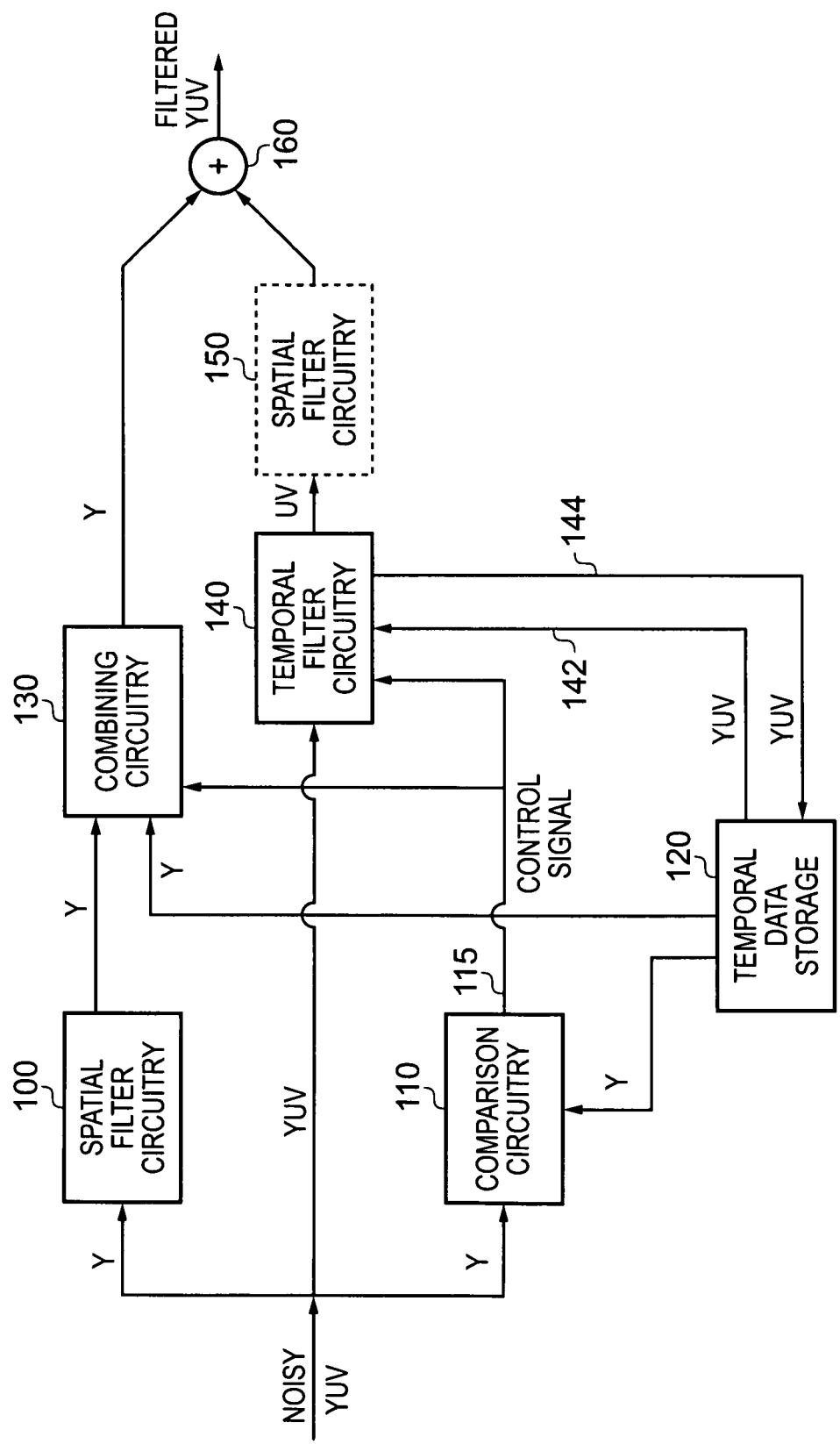
FIG. 4 is a block diagram illustrating filter circuitry in accordance with an alternative embodiment.

FIG. 4 illustrates an alternative embodiment of the present invention where the spatial filter circuitry 100 is used to process only the luminance component of the input noisy YUV stream. Temporal filter circuitry 140 is provided for performing a temporal filter operation on the incoming YUV stream. The temporal filter circuitry 140 may apply any of a variety of different temporal filtering techniques, but typically will have access to temporal data in the temporal data storage 120 over path 142, and often will output updated temporal data over path 144 to the temporal data storage 120 as the temporal filtering operation is applied to the incoming YUV stream.

In one embodiment, the temporal filtering circuitry 140 is also controlled by the control signal output over path 115 from the comparison circuitry 110 so as to combine the input noisy YUV image signal with the current temporal data in a proportion dictated by the value of the control signal, in a manner analogous to the operation of the combining circuitry 130 operating on the luminance signal. The chroma component of the output from the temporal filter circuitry 140 is then used to form the chroma component of the filtered YUV stream, with the summation circuitry 160 being used to merge the chroma component output from the temporal filter circuitry 140 with the luma component produced by the combining circuitry 130.

As will be apparent from the earlier discussion of FIG. 2, the chroma information is typically of a lower resolution than the luma information (e.g. a quarter of the resolution for YUV 420 format), and the processes applied by the ISP 20 hence serve to produce a noisy YUV stream in which the chroma components are significantly more noisy than the luma components. Given this fact, the embodiment shown in FIG. 4 will typically include a spatial filter circuit 150 at the output of the temporal filter circuitry 140, in order to apply a spatial filtering operation to the UV components produced by the temporal filter circuitry prior to providing that spatially filtered UV signal to the summation block 160. The spatial filtering circuitry 150 can in one embodiment be constructed in an identical manner to the spatial filter circuitry 100, although if desired the actual filter kernel applied by the low pass filter within the spatial filter circuitry can be varied between the spatial filter circuitry 100 and the spatial filter circuitry 150 so as to provide a stronger filtering of the chrominance components than is applied to the luminance components.

Figure 5:
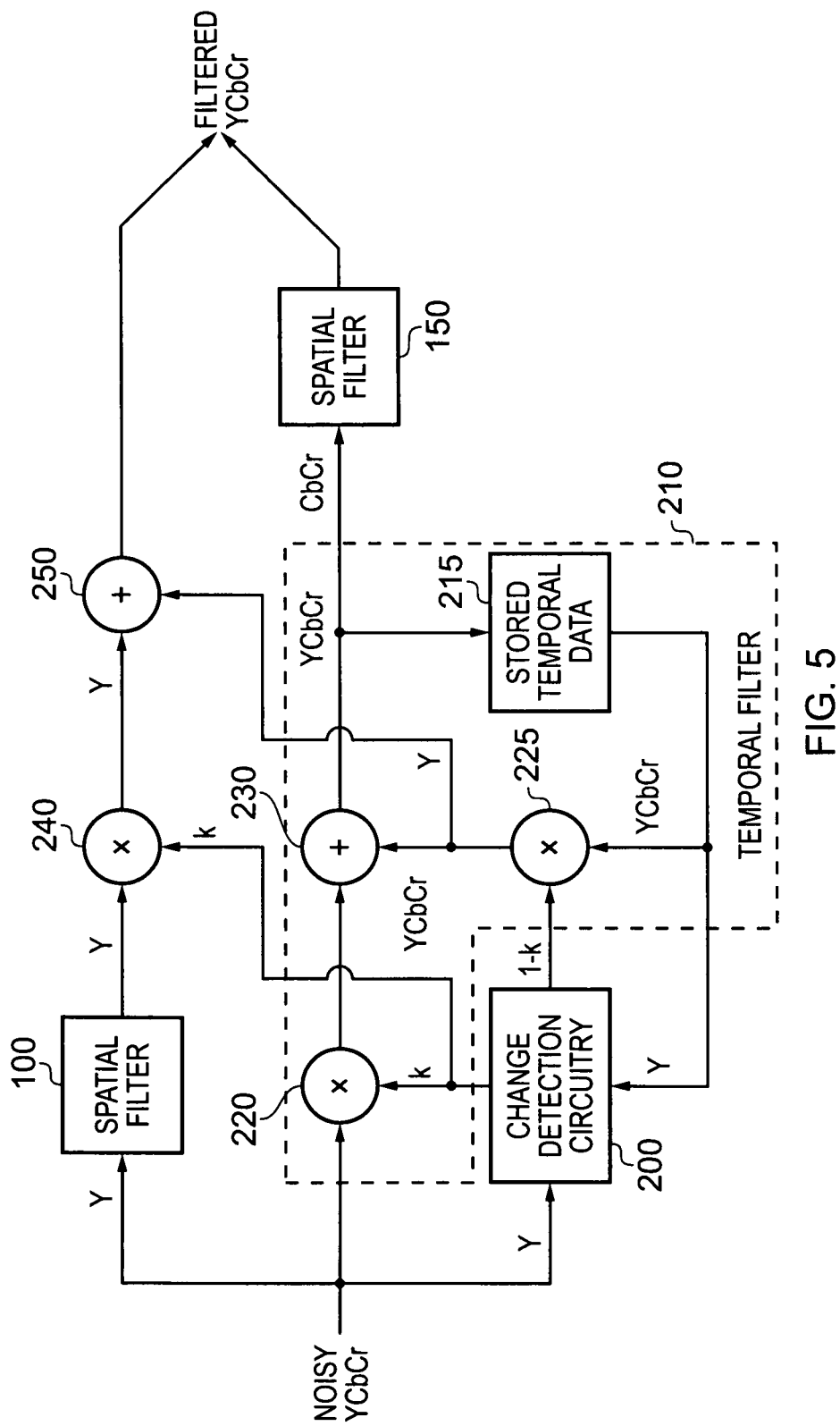
FIG. 5 is a diagram illustrating in more detail one embodiment of the filter circuitry of FIG. 4.

FIG. 5 is a diagram illustrating a particular embodiment of the filter circuitry of FIG. 4. In particular, FIG. 5 shows more details of the operation of the temporal filter circuitry 140 and the combining circuitry 130. Considering first the temporal filter circuitry 140, this is formed by the components within the dotted box 210 in FIG. 5. In this example, the temporal filter 210 includes some storage 215 for storing temporal data, in this example the temporal filter being a temporal recursive filter that maintains within the storage 215 an accumulated temporally filtered image signal that is combined by the temporal filter with a current image signal in order to form the filter output. Hence, by way of example, whilst the temporal filter 210 is processing the pixels of image signal N, it will use as the stored temporal data within the storage 215 the accumulated temporal data produced as a result of its previous processing up to and including the image signal N−1. When the temporal filter then moves on to process image signal N+1, the stored temporal data 215 will be updated to reflect the accumulated temporal data up to and including the processing of image signal N.

The comparison circuitry 110 of FIG. 4 is embodied as change detection circuitry 200 in FIG. 5, which uses the luminance value of the current image signal and the luminance value from the stored temporal data to detect a change between these two values. That change is then used to generate an output parameter k and a corresponding output parameter 1-k. The operation of the change detection circuitry 200 of one embodiment will be described later with reference to FIG. 9, but in one embodiment a non-linear function is performed when generating the parameter k, so that the parameter k varies between a value of 0 and 1 and increases exponentially as the absolute difference between the luminance of the current image signal and the luminance of the stored temporal data varies.

The multiplier 220 within the temporal filter 210 then multiplies the current image signal by the factor k whilst the multiplier 225 multiplies the stored temporal data by the parameter 1-k. The outputs from these two multipliers 220, 225 are then provided to the summation block 230 which sums the two signals in order to produce the filtered output signal from the temporal filter. This output signal is used to generate an updated stored temporal data for use in association with the next image signal, and the chrominance component is output to the spatial filter 150.

As also shown in FIG. 5, the output from the multiplier 225 is also provided to the summation block 250. In addition, the multiplier 240 operates in a similar manner to the multiplier 220, in this case multiplying the spatially filtered output from the spatial filter 100 by the factor k. The output from the multiplier 240 is then summed with the luminance component of the output from the multiplier 225 by the summation block 250 to produce the filtered luminance value to be output from the filter circuitry. Accordingly, it can be seen that the components 225, 240 and 250 constitute the combining circuitry 130 of FIG. 4.

Figure 6A:
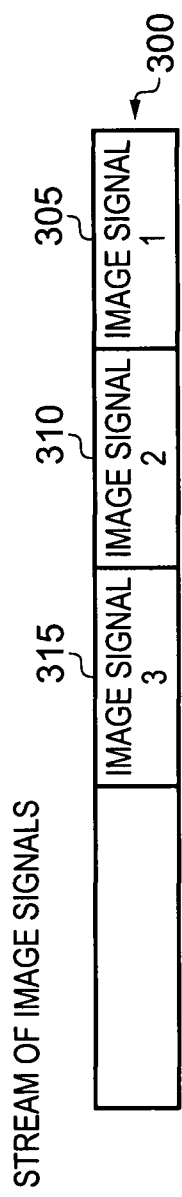
Figure 6B:
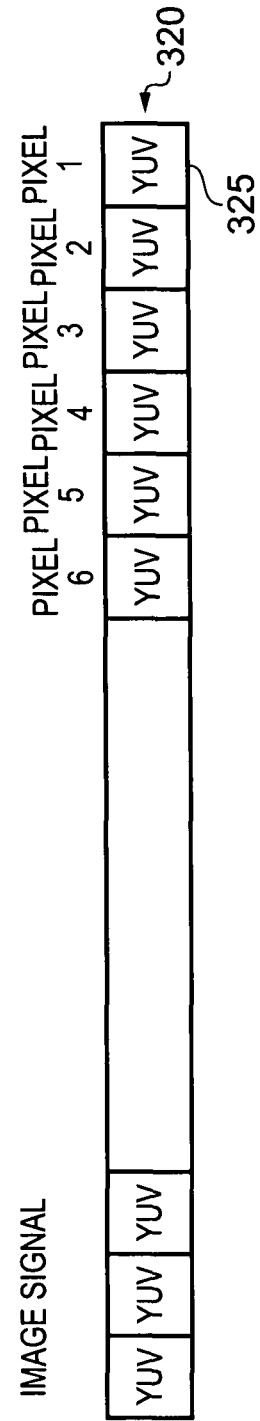

FIG. 6A schematically illustrates a stream of image signals 300, in particular showing a sequence of image signals 305, 310, 315 forming an input stream of image signals to the filter circuitry. Each image signal comprises data for a plurality of pixels forming the associated image, as shown schematically in FIG. 6B. In particular, the image signal 320 comprises a plurality of pixel data items 325, each pixel data item providing luminance and chrominance components for the associated pixel. It will be appreciated that the illustration of FIG. 6B is only schematic, as often the chrominance components are not specified individually for every pixel, but instead are shared between a number of pixels. For example, in accordance with the earlier described YUV 420 scheme, four pixels are represented by four luminance values, one U value and one V value. However, irrespective of how the information is actually encoded within the image signal, it will be understood that that information provides in effect luminance and chrominance values for every pixel. The information may be passed sequentially into the filter circuitry one pixel at a time, or some degree of parallelisation may be used within the filter circuitry to enable multiple pixels of a current image signal to be processed at the same time.

As illustrated schematically with reference to the table of FIG. 6C, whilst the pixels of the current image signal are being processed, the stored temporal data 215 used by the temporal filter 210 reflects the version of that temporal data as produced after applying the temporal filtering operation to the preceding video image signal. The very first image signal of a video sequence needs to be treated as a special case, and in particular the stored temporal data within the storage 215 has to be set to some predetermined value. In one embodiment, the first image signal itself may be written as the stored temporal data 215 for the first iteration, so that the change detection circuitry 200 detects no changes during processing of the first image signal and accordingly merely outputs the stored temporal data as the output from the temporal filter with the luminance component of that data also forming the output from the summation block 250 due to the parameter k being set to zero by the change detection circuitry. Alternatively, one may force the control signal k to be one during the first iteration, so as to cause both the temporal filtering circuitry output and the filtered luminance output to be based only on the first input frame, and to disregard the initial contents of the stored temporal data.

Figure 7:
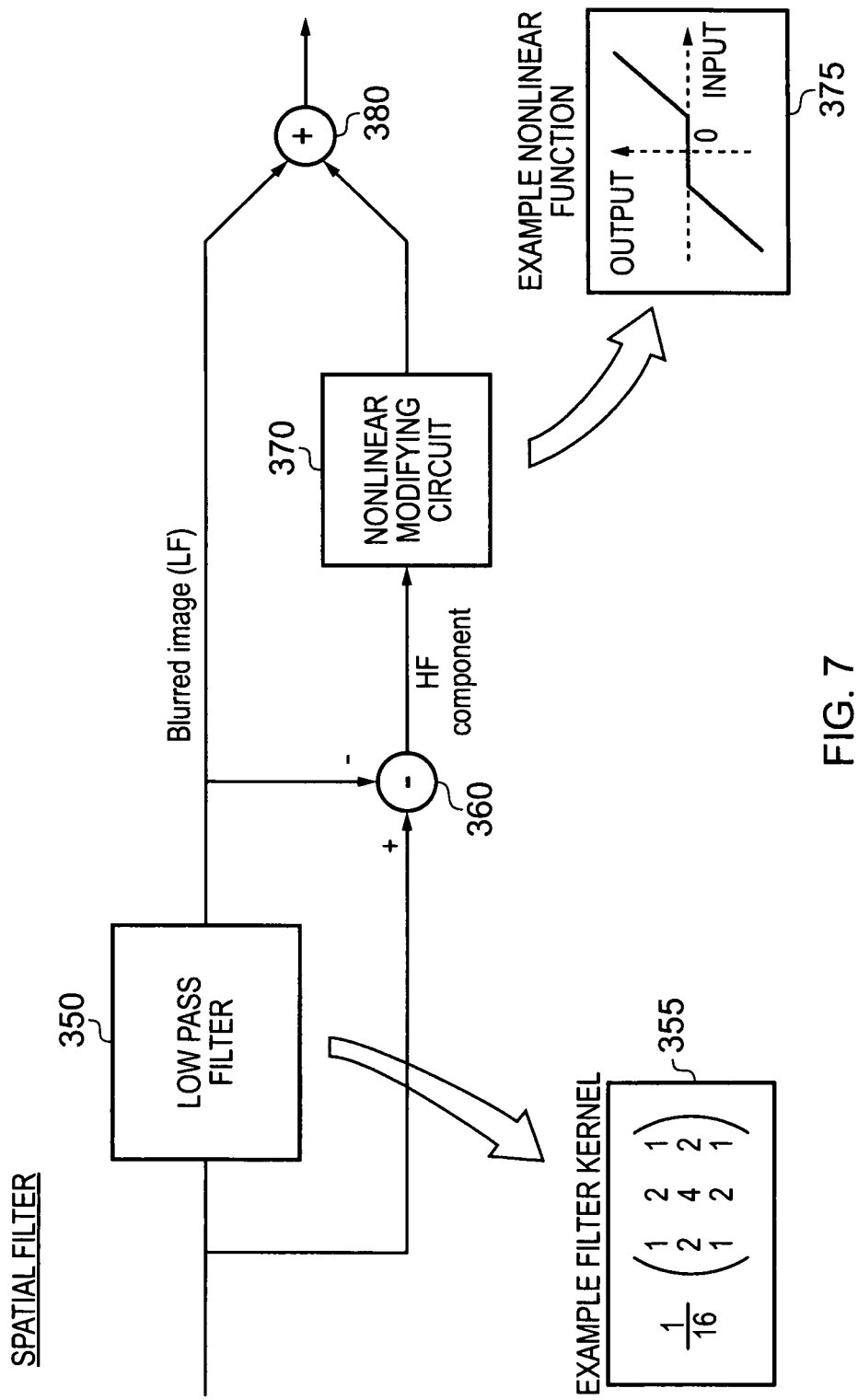
FIG. 7 is a diagram illustrating the spatial filter used in one embodiment.

FIG. 7 illustrates the form of spatial filter used in one embodiment to implement both the spatial filter 100 and the spatial filter 150 of FIG. 5. In particular, the spatial filter uses a spatial low-pass filter, also known as a smoothing filter, indicated schematically by the box 350 in FIG. 7. This filter is implemented in the form of a convolution of the noisy input image with a smoothing filter kernel. The kernel can be chosen with computational efficiency in mind, such as the 3×3 binomial kernel 355 illustrated schematically in FIG. 7. Such a choice of kernel reduces the multiplications to binary left shifts and the division to a four bit binary right shift, and hence can be implemented very efficiently in hardware.

The operation of such a low pass filter serves to remove high frequency features from the input image. Whilst these high frequency features will include noise, they also may include certain high frequency features that represent image detail. Due to this loss of detail, the output from the low pass filter represents a low frequency, slightly blurred, image.

To improve the output from the spatial filter, in one embodiment non-linear thresholding circuitry is used as represented by the components 360, 370 shown in FIG. 7. This non-linear thresholding circuitry operates in a manner analogous to the sharpening module described by Erik Persson, one of the inventors of the current application, in commonly owned U.S. Pat. No. 7,751,642, the entire contents of which are hereby incorporated by reference. In particular, as shown in FIG. 7, the low frequency output from the low pass filter 350 is subtracted by the subtraction circuit 360 from the original input to the low pass filter 350 in order to generate a first signal identifying the high frequency features which have been removed by the low pass filter. These high frequency components are then passed through non-linear modifying circuit 370 which applies to the first signal a non-linear function such as the example non-linear function 375 illustrated in FIG. 7. As will be apparent from that illustrated function, this serves to suppress low amplitude high frequency components, these typically being the components associated with noise rather than image detail. As a result, the output signal from the non-linear modifying circuit 370 will no longer contain many of the noisy high frequency components, and accordingly by adding that output signal back into the output from the low pass filter 350 using the summation circuitry 380, a significantly sharpened output can be generated by the spatial filter circuitry 100 when compared with a spatial filter circuitry employing only a low pass filter.

Figure 8:
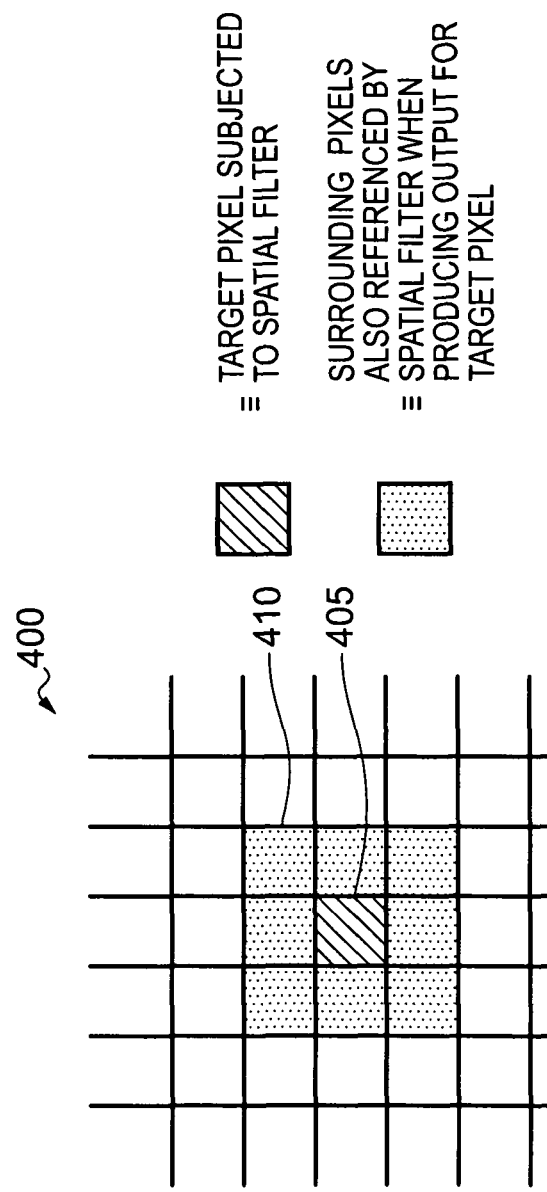
FIG. 8 illustrates the pixels subjected to the filter kernel operation by the low pass filter of FIG. 7 in accordance with one embodiment.

FIG. 8 is a diagram schematically illustrating the pixels used by the low pass filter 350 when applying the filter kernel 355. In particular, the low pass filter 350 operates on each pixel of the input image and chooses a 3×3 matrix of pixels centred on the pixel currently being processed. Hence, as shown in FIG. 8, if the pixel 405 is assumed to be the pixel being processed by the low pass filter, the surrounding pixels 410 are also subjected to the low pass filter operation for the pixel 405, with the relative weightings applied to each of the pixels being as indicated by the filter kernel 355.

Figure 9:
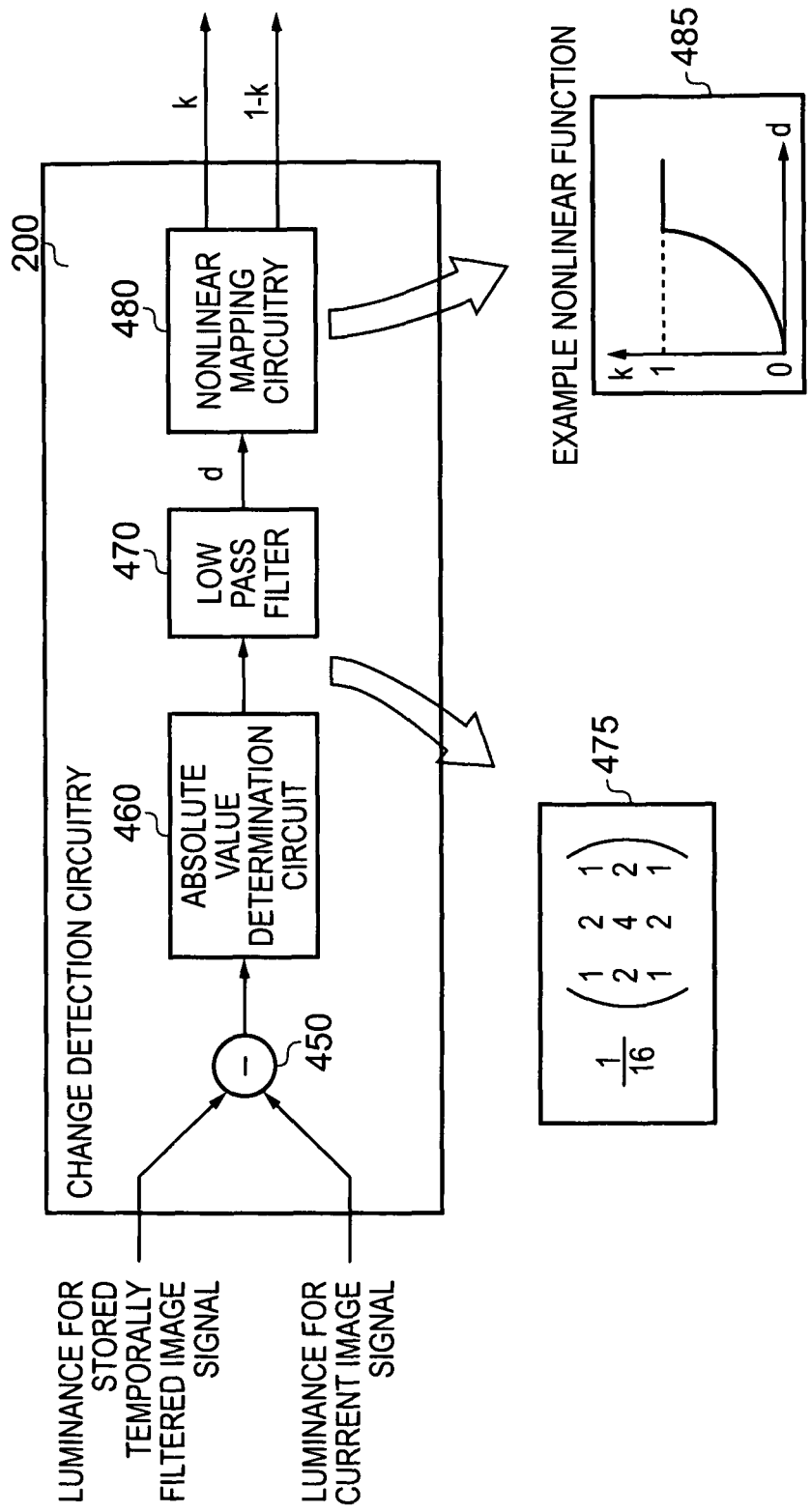
FIG. 9 is a diagram illustrating the change detection circuitry of one embodiment.

FIG. 9 is a diagram illustrating the operation of the change detection circuitry 200 of FIG. 5 in accordance with one embodiment. In particular, a subtraction circuit 450 receives the luminance signal for a current image signal and the luminance component of the stored temporally filtered image signal in the storage 215, with the output being passed to absolute value determination circuit 460 for determining the absolute value of the difference. Collectively, the components 450 and 460 form an absolute difference determination circuit. The absolute difference is then passed to a low pass filter 470 which operates in an analogous manner to the low pass filter 350 described earlier with reference to FIG. 7. Indeed, in one embodiment, the filter kernel 475 applied by the low pass filter 470 may be chosen to be the same as the filter kernel 355 applied by the low pass filter 350. However, in the example of FIG. 9, this filter operation is applied to the matrix of absolute difference values as output by the absolute value determination circuit 460 in respect of the various pixels of the current image signal.

For each pixel of the current image signal, this results in the generation of a internal value d as an output from the low pass filter 470. Each value of d is then subjected to a non-linear mapping function by the non-linear mapping circuitry 480 in order to generate a corresponding output value k (and a corresponding value 1-k). An example of a non-linear function that may be used in one embodiment is shown by the box 485 in FIG. 9. It has been found experimentally that an exponential relationship between the detected change d and the parameter k produces the best results, both in terms of perceived image quality and peak signal-to-noise ratio (PSNR) used to evaluate the efficiency of the encoder 40. This is in major contrast to the linear and negative quadratic relationships proposed for the motion adaptive control unit described in the earlier-mentioned article "A New Video Noise Reduction Algorithm Using Spatial Sub-Bands".

To simplify the hardware of the nonlinear mapping circuitry 480, the profile of the exponential function 485 can be implemented as a series of linear segments if desired, to thereby form a piecewise linear curve.

Figure 10:
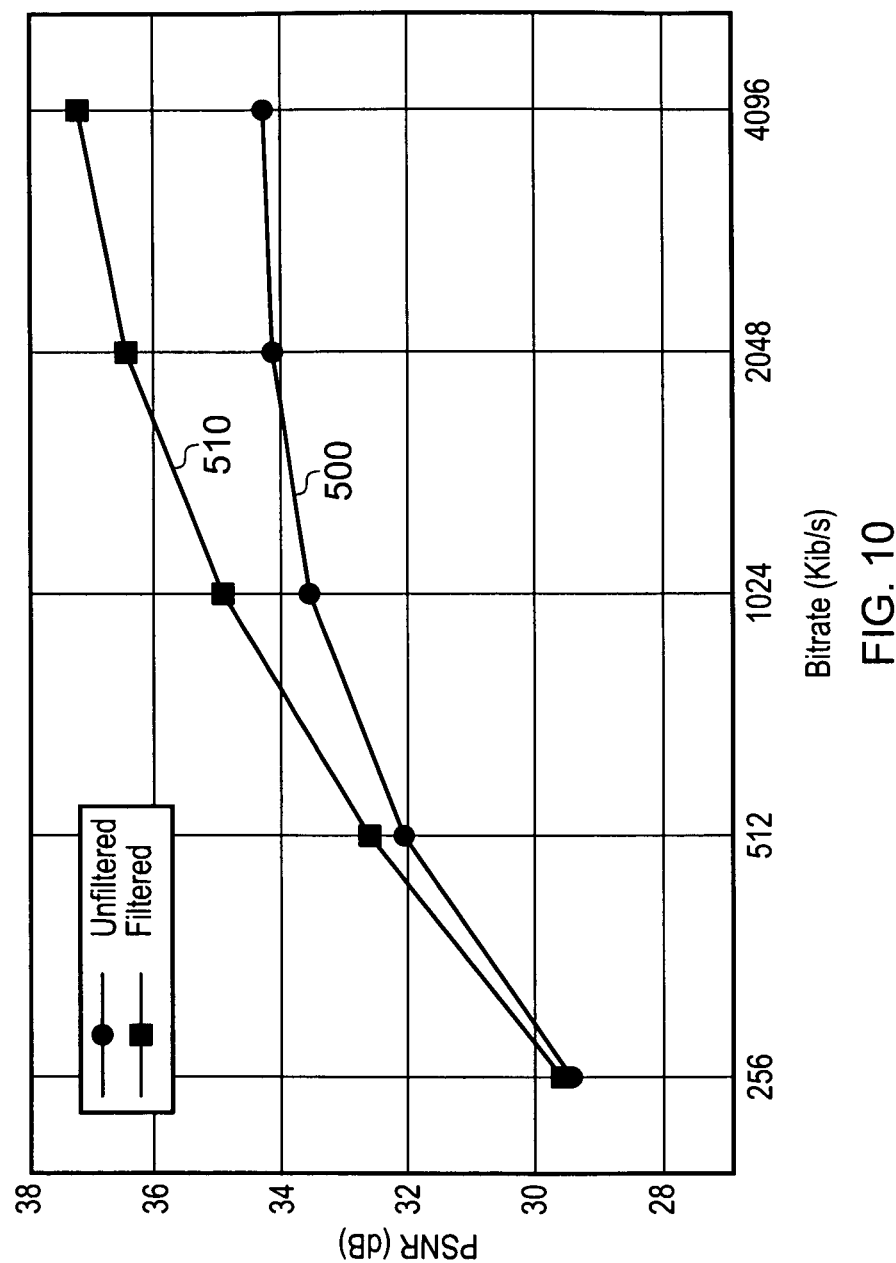
FIG. 10 is a graph illustrating how peak signal-to-noise ratio (PSNR) varies with bit rate for an unfiltered input to the encoder and for an input to the encoder that has been filtered using filter circuitry of one embodiment.

FIG. 10 schematically illustrates the variation of PSNR with bit rate at the output of the encoder 40 when the encoder 40 uses an unfiltered input (as indicated by the line 500) or a filtered input provided by a filter circuit 30 constructed in accordance with one embodiment of the present invention (as indicated by the line 510). From FIG. 10, it will be appreciated that significant increases in PSNR can be achieved for a particular output bit rate. Similarly, for a particular desired PSNR, a significant reduction in output bit rate can be achieved, due to the significantly improved compression that results from processing the filtered YUV stream as opposed to the unfiltered YUV stream. Indeed, drastic bit rate improvements such as halving the bit rate at constant PSNR have been achieved.

It has been found that the filter circuitry of embodiments of the present invention is particularly well suited to noisy images of the type acquired by a CMOS camera, as is often used in mobile devices such as a mobile phone. The colour interpolation and correction normally applied in an ISP gives rise to a particular type of coloured noise that the filter circuitry of embodiments of the present invention significantly reduces. Further, such embodiments avoid any noticeable motion blur, a common artefact in other temporal filters, by locally turning to spatial filtering where there is considerable motion in the image.

In addition, in embodiments using a temporally recursive temporal filter, reduction in bandwidth requirements can be achieved when compared with the use of other temporal filters that typically require access to more stored images. This is particularly advantageous in embedded systems, where memory bandwidth is an important issue.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. Filter circuitry for reducing noise in an input stream of image signals having luminance and chrominance components, comprising:
   spatial filter circuitry configured, for a current image signal of the input stream, to generate a spatially filtered internal signal from at least the luminance component of the current image signal;
   comparison circuitry configured to compare the current image signal with temporal data derived from multiple image signals of said input stream, and to generate a control signal dependent on said comparison; and
   combining circuitry configured to combine, in a ratio determined by said control signal, the spatially filtered internal signal with at least a luminance component derived from said temporal data, in order to generate at least the luminance component of a current output image signal forming a noise reduced version of the current image signal.

2. Filter circuitry as claimed in claim 1, further comprising:
   temporal filter circuitry configured, for the current image signal, to generate a temporally filtered image signal in dependence on said temporal data, the temporally filtered image signal having luminance and chrominance components.

3. Filter circuitry as claimed in claim 2, wherein:
   said temporal data comprises a stored temporally filtered image signal; and said comparison circuitry comprises change detection circuitry configured to detect a change between said current image signal and said stored temporally filtered image signal, and to generate the control signal dependent on the detected change.

4. Filter circuitry as claimed in claim 3, wherein said temporally filtered image signal generated by the temporal filter circuitry for said current image signal is used to form said stored temporally filtered image signal for use in connection with a subsequent image signal in said input stream.

5. Filter circuitry as claimed in claim 3, wherein the change detection circuitry comprises:
absolute difference circuitry for creating an absolute difference between the luminance component of the stored temporally filtered image signal and the luminance component of the current image signal, and to generate the control signal in dependence on said absolute difference.

6. Filter circuitry as claimed in claim 5, wherein the change detection circuitry further comprises:
nonlinear mapping circuitry for applying a nonlinear mapping function to a signal derived from said absolute difference, in order to generate a value of the control signal.

7. Filter circuitry as claimed claim 6, wherein:
the nonlinear mapping function is an exponential function such that a value of the control signal increases exponentially with increase in the signal derived from said absolute difference; and
the combining circuitry is arranged, in response to changes in the value of the control signal, to change proportionally the ratio between said spatially filtered internal signal and said at least a luminance component derived from said temporal data.

8. Filter circuitry as claimed in claim 6, wherein the change detection circuitry further comprises:
low pass filter circuitry to generate the signal derived from said absolute difference that is then used as an input to the nonlinear mapping circuitry.

9. Filter circuitry as claimed in claim 3, wherein the temporal filter circuitry generates the temporally filtered image signal by combining the current image signal with the stored temporally filtered image signal in a ratio determined by said control signal.

10. Filter circuitry as claimed in claim 2, wherein:
the spatial filter circuitry is configured to generate the spatially filtered internal signal from only the luminance component of the current image signal;
the combining circuitry is configured to generate only the luminance component of the current output image signal; and
the filter circuitry further comprises chrominance generation circuitry for generating the chrominance component of the current output image signal from the chrominance component of the temporally filtered image signal.

11. Filter circuitry as claimed in claim 10, wherein the chrominance generation circuitry applies a spatial filtering operation to generate the chrominance component of the current output image signal from the chrominance component of the temporally filtered image signal.

12. Filter circuitry as claimed in claim 11, wherein said chrominance generation circuitry comprises:
low pass filter circuitry for removing high frequency features from the chrominance component of the temporally filtered image signal, said high frequency features including high frequency noise; and
nonlinear thresholding circuitry for recovering one or more of said high frequency features that represent image detail removed by the low pass filter circuitry.

13. Filter circuitry as claimed in claim 12, wherein the nonlinear thresholding circuitry comprises:
subtraction circuitry for subtracting the output of the low pass filter circuitry from said chrominance component of the temporally filtered image signal in order to generate a first signal identifying said high frequency features;
modifying circuitry for applying a nonlinear function to said first signal to generate a second signal in which the high frequency features of low amplitude are suppressed; and
summation circuitry for adding the second signal to the output of the low pass filter circuitry.

14. Filter circuitry as claimed in claim 1, wherein the spatial filter circuitry comprises:
low pass filter circuitry for removing high frequency features from said at least the luminance component of the current image signal, said high frequency features including high frequency noise; and
nonlinear thresholding circuitry for recovering one or more of said high frequency features that represent image detail removed by the low pass filter circuitry.

15. Filter circuitry as claimed in claim 14, wherein the nonlinear thresholding circuitry comprises:
subtraction circuitry for subtracting the output of the low pass filter circuitry from said at least the luminance component of the current image signal in order to generate a first signal identifying said high frequency features;
modifying circuitry for applying a nonlinear function to said first signal to generate a second signal in which the high frequency features of low amplitude are suppressed; and
summation circuitry for adding the second signal to the output of the low pass filter circuitry.

16. Filter circuitry as claimed in claim 1, wherein each image signal comprises a plurality of pixel data items, each pixel data item comprising luminance data and chrominance data for the associated pixel.

17. Filter circuitry as claimed in claim 16, wherein:
the comparison circuitry is configured to compare each pixel data item of the current image signal with a corresponding pixel data item of said temporal data, and to generate a separate control signal for each pixel data item.

18. Video encoding circuitry comprising:
filter circuitry as claimed in claim 1 for receiving an input stream of image signals and generating a corresponding output stream of image signals having reduced noise when compared with the input stream; and
encoder circuitry for applying a compression scheme to compress the output stream from the filter circuitry in order to generate a bitstream of encoded video data.

19. A method of reducing noise in an input stream of image signals having luminance and chrominance components, comprising the steps of:
employing spatial filter circuitry, for a current image signal of the input stream, to generate a spatially filtered internal signal from at least the luminance component of the current image signal;
comparing the current image signal with temporal data derived from multiple image signals of said input stream, and generating a control signal dependent on said comparison; and combining, in a ratio determined by said control signal, the spatially filtered internal signal with at least a luminance component derived from said temporal data, in order to generate at least the luminance component of a current output image signal forming a noise reduced version of the current image signal.

* * * * *